(12) United States Patent
Richman

(10) Patent No.: US 9,111,107 B2
(45) Date of Patent: Aug. 18, 2015

(54) COMPUTER ECOSYSTEM PROVIDING A PROCESS FOR DETERMINING TRUST IN CONTENT SHARING

(71) Applicant: SONY CORPORATION, Tokyo (JP)

(72) Inventor: Steven Martin Richman, San Diego, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/158,135

(22) Filed: Jan. 17, 2014

(65) Prior Publication Data

US 2015/0205969 A1    Jul. 23, 2015

(51) Int. Cl.
G06F 21/62    (2013.01)
H04L 29/06    (2006.01)
G06F 21/60    (2013.01)

(52) U.S. Cl.
CPC .............. G06F 21/62 (2013.01); G06F 21/604 (2013.01)

(58) Field of Classification Search
CPC ....... G06F 21/62; G06F 21/604; G06F 21/10; G06F 21/60; H04L 63/101
See application file for complete search history.

(56) References Cited

U.S. PATENT DOCUMENTS

| | | | |
|---|---|---|---|
| 6,748,531 B1 | 6/2004 | Epstein | |
| 7,523,310 B2 | 4/2009 | Narin et al. | |
| 7,624,111 B2 | 11/2009 | Reddish et al. | |
| 7,822,631 B1 | 10/2010 | Vander Mey et al. | |
| 8,090,673 B2 | 1/2012 | Evans | |
| 8,359,225 B1 | 1/2013 | Seth | |
| 8,490,157 B2 | 7/2013 | Thompson et al. | |
| 2004/0003251 A1 | 1/2004 | Narin et al. | |
| 2006/0272002 A1 | 11/2006 | Wightman et al. | |
| 2006/0294102 A1 | 12/2006 | Reddish et al. | |
| 2009/0216859 A1* | 8/2009 | Dolling ........................ | 709/218 |
| 2010/0169265 A1 | 7/2010 | Ristock et al. | |
| 2012/0072723 A1 | 3/2012 | Orsini et al. | |
| 2012/0173877 A1 | 7/2012 | Pendakur et al. | |
| 2012/0291137 A1* | 11/2012 | Walsh et al. ..................... | 726/26 |
| 2013/0018737 A1 | 1/2013 | Kumar et al. | |
| 2013/0283392 A1 | 10/2013 | Mirashrafi | |

* cited by examiner

*Primary Examiner* — Izunna Okeke
(74) *Attorney, Agent, or Firm* — John L. Rogitz

(57) ABSTRACT

A user can assign a level of trust to other users to manage what content they may access or share. The user also assigns to each level of trust content type that may be accessed by users having that level of trust. The user then sends tags to his contacts indicating their level if trust, which are then presented by the contacts to gain access to the user-defined content.

18 Claims, 3 Drawing Sheets

COMPUTER ECOSYSTEM PROVIDING A PROCESS FOR DETERMINING TRUST IN CONTENT SHARING

FIELD OF THE INVENTION

The present application relates generally to computer ecosystems and more particularly to providing various circles of user-based trust.

BACKGROUND OF THE INVENTION

A computer ecosystem, or digital ecosystem, is an adaptive and distributed socio-technical system that is characterized by its sustainability, self-organization, and scalability. Inspired by environmental ecosystems, which consist of biotic and abiotic components that interact through nutrient cycles and energy flows, complete computer ecosystems consist of hardware, software, and services that in some cases may be provided by one company, such as Sony. The goal of each computer ecosystem is to provide consumers with everything that may be desired, at least in part services and/or software that may be exchanged via the Internet. Moreover, interconnectedness and sharing among elements of an ecosystem, such as applications within a computing cloud, provides consumers with increased capability to organize and access data and presents itself as the future characteristic of efficient integrative ecosystems.

Two general types of computer ecosystems exist: vertical and horizontal computer ecosystems. In the vertical approach, virtually all aspects of the ecosystem are owned and controlled by one company, and are specifically designed to seamlessly interact with one another. Horizontal ecosystems, one the other hand, integrate aspects such as hardware and software that are created by other entities into one unified ecosystem. The horizontal approach allows for greater variety of input from consumers and manufactures, increasing the capacity for novel innovations and adaptations to changing demands.

Present principles are directed to specific aspects of computer ecosystems, specifically, to establishing trust in a computer ecosystem.

SUMMARY OF THE INVENTION

As understood herein, when intending to share content with a person or device, or receive content or communication messages from a second party or device, a consumer may wish to determine a level of trust for that person or device. This allows the person to understand if that person or device can receive certain types of content or they the person wishes to block content coming from a person or device. A level of trust must be established that allows for a person to make the decision to send or receive content or communication, or to allow someone else automatic access to their device or information.

Accordingly, an intelligent trust system assigns level of trust and importance to identities of people or devices for purpose of ensuring the most appropriate content, information, or communication is shared with the intended person's device. This prevents situations in which libraries of content are opened up to all individuals regardless of the level of trust, or withholding all sharing entirely in order to protect from sharing sensitive information that a user desires only certain people to receive or be given access to. An example of this would be if a family member who wishes to allow another family member to access private messages or notes about when dinner will be prepared or photos that were taking on the family vacation. In effect, concentric circles of trust are established that are given different levels of priority of access or communication.

In one aspect, a device includes at least one computer memory bearing instructions executable by a processing circuit, and at least one processing circuit configured for accessing the computer memory to execute the instructions to configure the processing circuit for receiving input from a user of a level of trust to be accorded to each of plural contacts of the user. For each contact, the processing circuit when executing the instructions is configured for generating a tag indicating the level of trust assigned to the respective content by the user. The processing circuit when executing the instructions is configured for receiving input from the user assigning contents to the levels of trust such that a first level of trust is assigned first contents and a second level of trust is assigned second content, the first and second contents not being identical to each other, providing the tags to the respective contacts, and providing access to content to contacts responsive to respective indications of levels of trust of the respective contacts as indicated by the respective tags.

In example embodiments the contents assigned by the user may include content types. In non-limiting embodiments the processor when accessing the instructions receives user input designating a single piece of content by name for association with a level of trust. The processor when accessing the instructions may receive user input establishing a custom level of trust. In other examples the processor when accessing the instructions automatically establishes at least one group of multiple contacts and automatically assigns a level of trust to contacts in the group.

In some implementations, the processor when accessing the instructions automatically screens from a device associated with the user attempts to contact the user based at least in part on the tags. In some example implementations the processor when accessing the instructions receives from a contact an attempt to access content and in response thereto demands a tag from the contact and refuses access to the content responsive to no tag being produced, and otherwise responsive to a tag being produced by the contact permits access to content associated with the level of trust embodied by the tag.

In another aspect, a method includes assigning a level of trust to each one of plural contacts, assigning authorized contents to at least some levels of trust, and permitting access to a contact presenting indication of the level of trust of the contact only to contents associated with the level of trust of the contact.

In another aspect, a system includes at least one computer memory that is not a carrier wave and that includes instructions executable by a processor which is configured for accessing the computer memory to execute the instructions to configure the processor for presenting on a display a user interface (UI) including a list of a user's contacts. The processor when accessing the instructions is configured for presenting on the UI selectors respectively selectable for each contact in the list to assign a respective level of trust to each contact in the list.

In some embodiments the processor when executing the instructions is configured for generating a tag for each contact and sending the tag to the contact, with the tag indicating the level of trust of the contact. In example implementations of this last aspect, the UI is a first UI and the processor when executing the instructions is configured for presenting on the display a second UI in turn presenting a list of levels of trust and contents that are associable with each respective level of trust responsive to user input from the second UI. The contents in the second UI can be content types and/or individual pieces of content. In still further examples the UI is a first UI and the processor when executing the instructions is configured for presenting on the display a second UI in turn presenting a list of contact modes and that are associable with each respective level of trust responsive to user input from the second UI.

The details of the present invention, both as to its structure and operation, can be best understood in reference to the accompanying drawings, in which like reference numerals refer to like parts, and in which:

DETAILED DESCRIPTION OF THE PREFERRED EMBODIMENT

Figure 1:
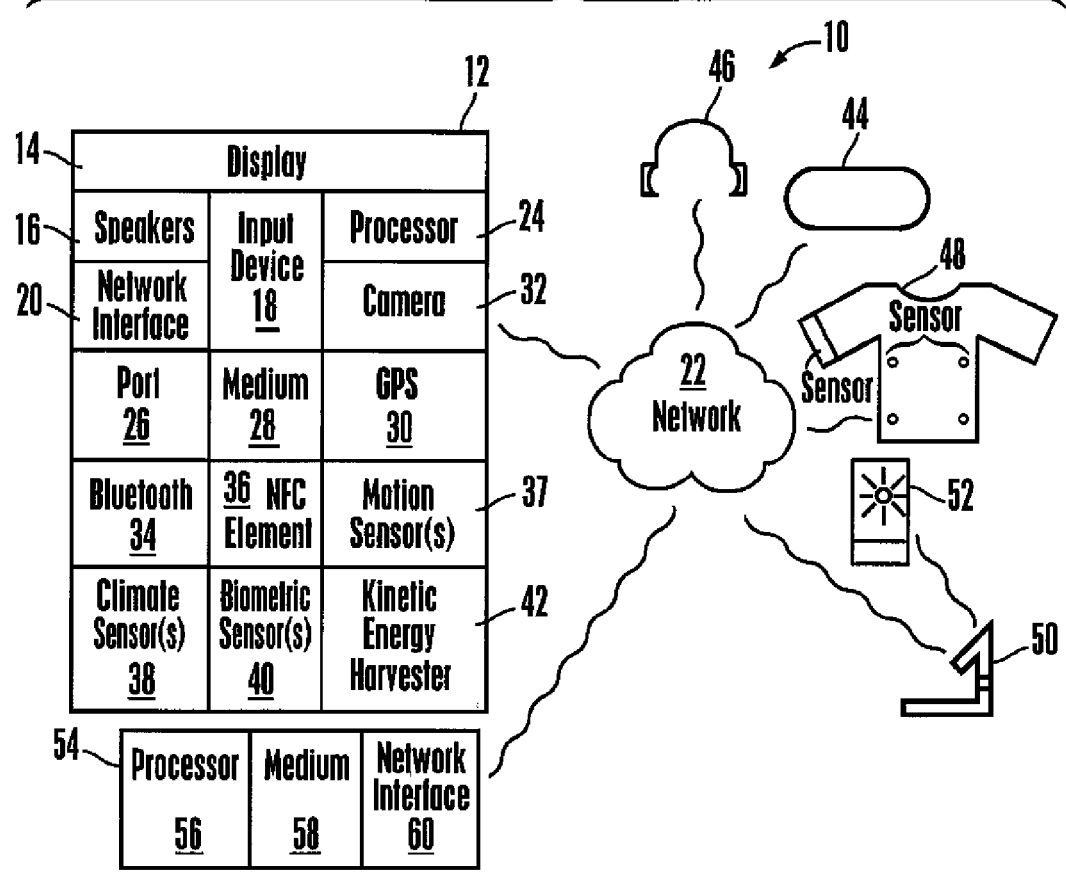
FIG. 1 is a block diagram of an example system including an example in accordance with present principles.

This disclosure relates generally to computer ecosystems including aspects of consumer electronics (CE) device based user information in computer ecosystems. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is an example consumer electronics (CE) device 12 that may be waterproof (e.g., for use while swimming). The CE device 12 may be, e.g., a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc., and even e.g. a computerized Internet-enabled television (TV). Regardless, it is to be understood that the CE device 12 is configured to undertake present principles (e.g. communicate with other CE devices to undertake present principles, execute the logic described herein, and perform any other functions and/or operations described herein).

Accordingly, to undertake such principles the CE device 12 can be established by some or all of the components shown in FIG. 1. For example, the CE device 12 can include one or more touch-enabled displays 14, one or more speakers 16 for outputting audio in accordance with present principles, and at least one additional input device 18 such as e.g. an audio receiver/microphone for e.g. entering audible commands to the CE device 12 to control the CE device 12. The example CE device 12 may also include one or more network interfaces 20 for communication over at least one network 22 such as the Internet, an WAN, an LAN, etc. under control of one or more processors 24. It is to be understood that the processor 24 controls the CE device 12 to undertake present principles, including the other elements of the CE device 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, WiFi transceiver, etc.

In addition to the foregoing, the CE device 12 may also include one or more input ports 26 such as, e.g., a USB port to physically connect (e.g. using a wired connection) to another CE device and/or a headphone port to connect headphones to the CE device 12 for presentation of audio from the CE device 12 to a user through the headphones. The CE device 12 may further include one or more tangible computer readable storage medium 28 such as disk-based or solid state storage, it being understood that the computer readable storage medium 28 may not be a carrier wave. Also in some embodiments, the CE device 12 can include a position or location receiver such as but not limited to a GPS receiver and/or altimeter 30 that is configured to e.g. receive geographic position information from at least one satellite and provide the information to the processor 24 and/or determine an altitude at which the CE device 12 is disposed in conjunction with the processor 24. However, it is to be understood that that another suitable position receiver other than a GPS receiver and/or altimeter may be used in accordance with present principles to e.g. determine the location of the CE device 12 in e.g. all three dimensions.

Continuing the description of the CE device 12, in some embodiments the CE device 12 may include one or more cameras 32 that may be, e.g., a thermal imaging camera, a digital camera such as a webcam, and/or a camera integrated into the CE device 12 and controllable by the processor 24 to gather pictures/images and/or video in accordance with present principles. Also included on the CE device 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the CE device 12 may include one or more motion sensors 37 (e.g., an accelerometer, gyroscope, cyclometer, magnetic sensor, infrared (IR) motion sensors such as passive IR sensors, an optical sensor, a speed and/or cadence sensor, a gesture sensor (e.g. for sensing gesture command), etc.) providing input to the processor 24. The CE device 12 may include still other sensors such as e.g. one or more climate sensors 38 (e.g. barometers, humidity sensors, wind sensors, light sensors, temperature sensors, etc.) and/or one or more biometric sensors 40 providing input to the processor 24. In addition to the foregoing, it is noted that in some embodiments the CE device 12 may also include a kinetic energy harvester 42 to e.g. charge a battery (not shown) powering the CE device 12.

Still referring to FIG. 1, in addition to the CE device 12, the system 10 may include one or more other CE device types such as, but not limited to, a computerized Internet-enabled bracelet 44, computerized Internet-enabled headphones and/or ear buds 46, computerized Internet-enabled clothing 48, a computerized Internet-enabled exercise machine 50 (e.g. a treadmill, exercise bike, elliptical machine, etc.), etc. Also shown is a computerized Internet-enabled entry kiosk 52 permitting authorized entry to a space. It is to be understood that other CE devices included in the system 10 including those described in this paragraph may respectively include some or all of the various components described above in reference to the CE device 12 such but not limited to e.g. the biometric sensors and motion sensors described above, as well as the position receivers, cameras, input devices, and speakers also described above.

Now in reference to the afore-mentioned at least one server 54, it includes at least one processor 56, at least one tangible computer readable storage medium 58 that may not be a carrier wave such as disk-based or solid state storage, and at least one network interface 60 that, under control of the processor 56, allows for communication with the other CE devices of FIG. 1 over the network 22, and indeed may facilitate communication between servers and client devices in accordance with present principles. Note that the network interface 60 may be, e.g., a wired or wireless modem or router, WiFi transceiver, or other appropriate interface such as, e.g., a wireless telephony transceiver.

Accordingly, in some embodiments the server 54 may be an Internet server, may include and perform "cloud" functions such that the CE devices of the system 10 may access a "cloud" environment via the server 54 in example embodiments.

Figure 2:
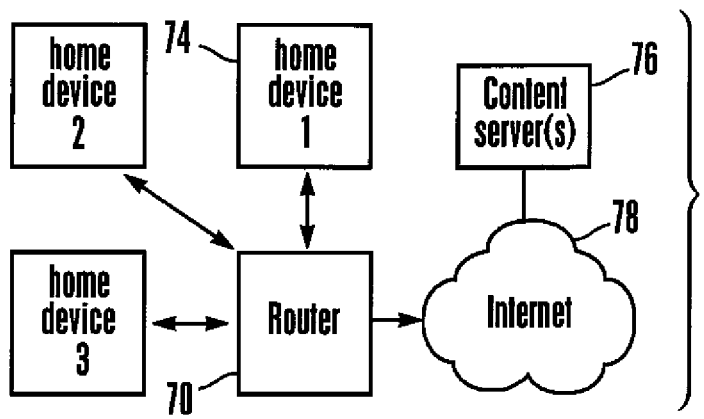
FIG. 2 is a block diagram of an example home network.

Now referring to FIG. 2, an example ecosystem embodied as a network can include an optional network router 70 that communicates via wired or wireless links 72 with plural devices 74 (three shown). The router may connect the network to one or more content servers 76 (such as the server 54 in FIG. 1) via a network such as the Internet 78. The devices 74 may be established by one or more of the CE devices described above. The router 70 typically includes a processor, computer memory, and network interface, and its functions may be assumed by one or more the home network devices 74.

Figure 3:
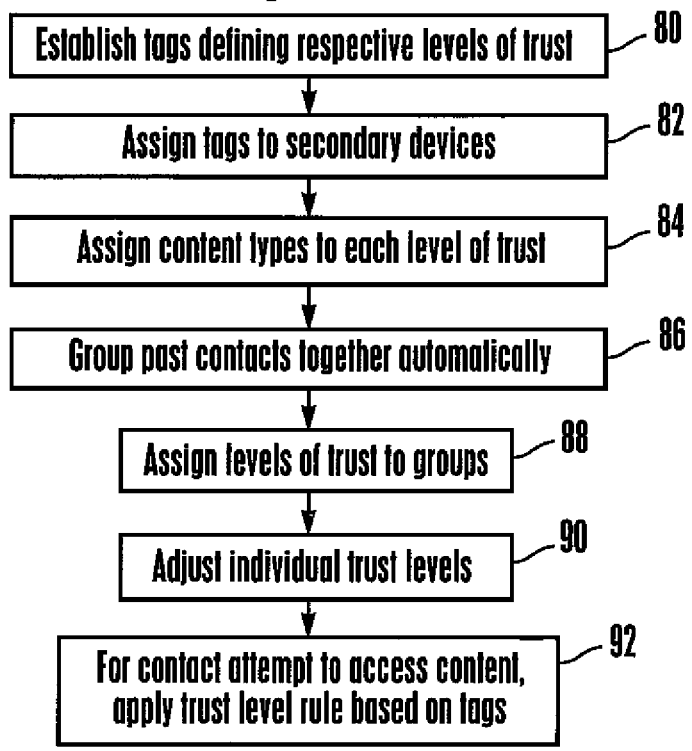
FIG. 3 is a flow chart of example logic according to present principles.

Regardless of how the network is embodied, FIG. 3 shows example logic that may be used to establish levels of trust. A virtual tag is created at block 80 by the primary device user, which is then assigned at block 82 a secondary person's phone number or device or personal profile. That tag is comprised of user defined values. These user defined values represent levels of trust that are important to the user and controlled by the user. Levels of trust can be custom-defined and the types of information or content allowed by those levels of trust are assigned by the user in block 84.

This process of establishing trust and assigning of actions or rights to information can also be automated, whereby past contacts are grouped together at block 86 and levels of trust assigned at block 88 based upon group association. For example, social network friends of the user may be grouped by which social network site they are friends on. Or, contacts of the user as accessed from a contact file in the user's computer may be grouped by virtue of sharing common domain names in their email address or other network address. Domain names may be looked up and for users grouped by virtue of having business-related domain names, lower levels of trust may be assigned, e.g., a level of "low" in a simple trust scheme having only three levels of trust, whereas users grouped by virtue of being listed in a "friend" contact list being accorded a trust level of "medium". Users having the same last name as the user of the CE device doing the grouping may be accorded the highest level of trust. Content access may then be assigned to each level of trust by the user by, e.g., content type. However custom tags for each secondary party or device can be edited and changed to further adjust rights at block 90.

These tags are then referenced at block 92 by the device constantly for controlling the sharing experience or filtering communication or information. For instance, the user may wish to share a particular piece of content only with devices presenting tags indicating a high level of trust. A user may wish to screen all incoming attempts to contact the user for devices presenting a tag indicating a low level of trust. Devices not presenting any tags at all may be screened from contact entirely. The rules may vary by time of day as further explained below.

Figure 4:
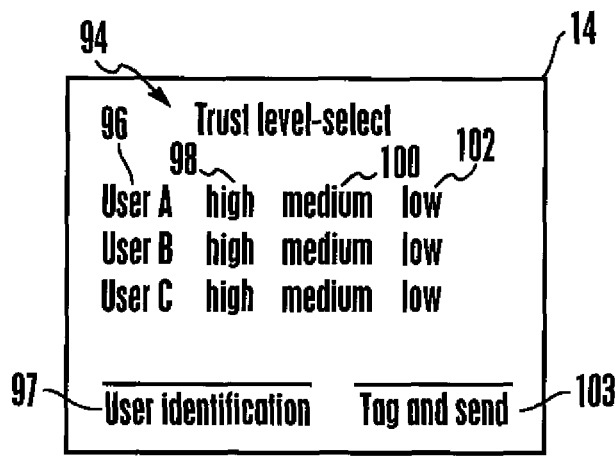
FIGS. 4-6 are screen shots of example user interfaces according to present principles.
Figure 5:
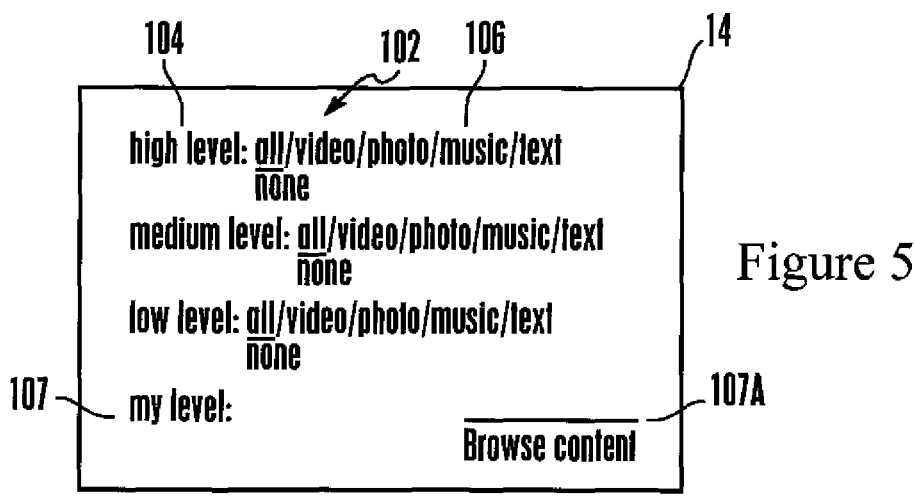
Figure 6:
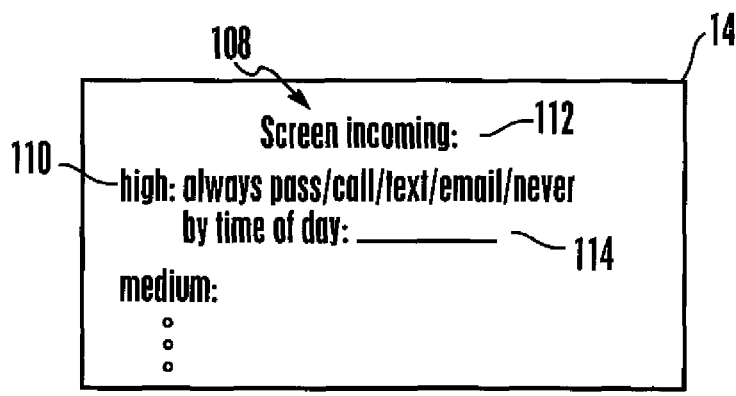

FIGS. 4-6 illustrate example user interfaces (UI) that may be presented on the display 14 of a user's CE device to undertake principles above. In FIG. 4 a UI 94 includes a list 96 of the user's contacts. These contacts may be accessed by the CE device processor accessing, without limitation, an email contact list and/or a social networking friend contact list and/or by prompting the user at 97 to enter the name or network address of a contact.

Then, selectors 98, 100, 102 may be respectively selected for each contact to assign a respective high, medium, or low level of trust to each individual contact in the list 96, it being understood that a three level paradigm of trust is used for exposition purposes only and not by way of limitation. For example, only two levels of trust may be provided for, or four or more levels of trust may be provided for. Once each contact in the list 96 has been assigned a level of trust, a user may select, at 103 to generate a tag for each contact and send the tag to the contact's network address with a message that "to access [user's] content, you will need this tag. Please store in a secure location in your device."

Prior to or after sending the tags to the contacts, the UI 102 of FIG. 5 may be invoked to enable the user to assign to each level of trust listed in a list 104 types of content 106 that may be accessed, as by sharing on a social networking site, for instance, or as by sharing directly from the CE device of the user. In the example shown, the user may select to authorize, for any particular level of trust, "all" content, "none" of the content, or can individually pick and choose from among video, photo, music, and text. Multiple content types may be selected. A custom level of trust may be established by the user by selecting at 107 to so establish another level of trust in addition to the others listed. Individual pieces of content also may be selected by the user by entering a name (browsing a content directory if desired) at 107A, with the individual pieces of content then being assigned by the user as desired to one or more of the levels of trust listed in the list 104.

Incoming attempts to contact the user may also be screened by level of trust in the user-assigned tags using the example UI 108 of FIG. 8. The levels of trust are listed in the column 110 and contact types 112 listed for each level. The user may elect, for each level of trust, whether to screen all attempts, no attempts, or only certain modes of attempted contact. In the non-limiting example shown, the user may elect to screen, for each level of trust, one or more of phone calls, text messages, emails.

The user may also enter at 114 a time of day limitation for which the screening applies. It is to be understood that each mode of contact screening may be associated with its own respective time of day effectiveness. For example, the user may elect, for a particular level of trust, to screen phone calls at night but pas them through during the day, while text messages for that particular level of trust may always be passed through for display and emails for the particular level of trust always screened, regardless of time of day.

The device on which content is sought to be accessed, whether the user's CE device or a social networking site server, is provided a list of content that pertains to each level of trust. When a contact attempts to access the content, the contact must present the tag provided by the user (owner of the content) and the level of trust embodied in the tag is used by the device being accessed to permit access to the contact only of the content authorized by the user for access by that particular level of trust embodied by the tag.

While the particular COMPUTER ECOSYSTEM PROVIDING A PROCESS FOR DETERMINING TRUST IN CONTENT SHARING is herein shown and described in detail, it is to be understood that the subject matter which is encompassed by the present invention is limited only by the claims.

What is claimed is:

1. A device comprising:
   at least one computer memory that is not a transitory signal and that comprises instructions executable by at least one processing circuit;
   presenting a user interface (UI) on a display, the UI including a list of contacts and next to the list of contacts, plural selectors each respectively selectable for each contact to assign a respective one of plural levels of trust to each contact in the list;
   receiving input from the UI of a level of trust to be accorded to plural contacts on the list;
   for each contact for which a level of trust has been received, generating respective data indicating the level of trust assigned to the respective contact;
   receiving input assigning contents to the levels of trust such that a first level of trust is assigned first contents and a second level of trust is assigned second content, the first and second contents not being identical to each other;
   providing the respective data to the respective contacts;
   providing access to content to contacts responsive to respective indications of levels of trust of the respective contacts as indicated by the respective data; and
   automatically screening from a device associated with the user attempts to contact the user based at least in part on the respective data.

2. The device of claim 1, wherein the UI presents, next to at least first and second contacts on the list of contacts, respective first and second plural selectors, each of the first plural selectors being selectable to assign a respective level of trust to the first contact, each of the second plural selectors being selectable to assign a respective level of trust to the second contact.

3. The device of claim 1, wherein the instructions are executable to receive user input designating a single piece of content by name for association with a level of trust.

4. The device of claim 1, wherein the instructions are executable to receive user input establishing a custom level of trust.

5. The device of claim 1, wherein the instructions are executable to automatically establish at least one group of multiple contacts and automatically assigns a level of trust to contacts in the group.

6. The device of claim 1, wherein the instructions are executable to receive from a contact an attempt to access content and in response thereto demand respective data from the contact and refuses access to the content responsive to no respective data being produced, and otherwise responsive to respective data being produced by the contact permit access to content associated with the level of trust embodied by the respective data.

7. A Method, comprising:
assigning a level of trust to each one of plural contacts based on input to a user interface (UI) presenting a list of contacts and next to each contact on the list, plural trust level selector elements each being selectable to assign a respective level of trust to the respective contact;
assigning authorized contents to at least some levels of trust such that a first level of trust is assigned first contents and a second level of trust is assigned second content, the first and second contents not being identical to each other;
permitting access to a contact presenting indication of the level of trust of the contact to contents associated with the level of trust of the contact of the contact; and
automatically screening, from a device associated with a user, attempts to contact the user based at least in part on the respective data.

8. The method of claim 7, wherein the UI presents, next to at least first and second contacts on the list of contacts, respective first and second plural selectors, each of the first plural selectors being selectable to assign a respective level of trust to the first contact, each of the second plural selectors being selectable to assign a respective level of trust to the second contact.

9. The method of claim 7 comprising automatically establishing at least one group of multiple contacts and automatically assigning a level of trust to contacts in the group.

10. A System comprising:
at least one computer memory that is not a transitory signal and that includes instructions executable by at least one processor for:
presenting on a display a user interface (UI) including a list of a user's contacts and at least one selector selectable to assign a level of trust to one or more contacts in the list;
receiving input from the UI of a respective level of trust to be accorded to at least first and second contacts on the list;
for at least the first and second contacts, generating data indicating the level of trust assigned to the first and second contact;
receiving input assigning contents to the levels of trust such that a first level of trust is assigned first contents and a second level of trust is assigned second content, the first and second contents not being identical to each other;
providing access to content to the first and second contacts responsive to respective indications of levels of trust of the respective first and second contacts as indicated by the respective data; and
automatically screening from a device associated with the user attempts to access unauthorized content based at least in part on the respective data.

11. The system of claim 10, wherein instructions are executable for generating a tag for each contact and sending the tag to the contact, the tag indicating the level of trust of the contact.

12. The system of claim 10, wherein the UI is a first UI and the instructions are executable for presenting on the display a second UI, the second UI presenting a list of levels of trust and contents that are associable with each respective level of trust responsive to user input from the second UI.

13. The system of claim 12, wherein the contents in the second UI are content types.

14. The system of claim 13, wherein the contents in the second UI include at least one name of at least one individual piece of content.

15. The system of claim 10, wherein the UI is a first UI and the instructions are executable for presenting on the display a second UI, the second UI presenting a list of contact modes and that are associable with each respective level of trust responsive to user input from the second UI.

16. The device of claim 1, further comprising the at least one processing unit.

17. The system of claim 10, further comprising the at least one processor.

18. The system of claim 10, wherein the UI presents, next to at least first and second contacts on the list of the user's contacts, respective first and second plural selectors, each of the first plural selectors being selectable to assign a respective level of trust to the first contact, each of the second plural selectors being selectable to assign a respective level of trust to the second contact.

* * * * *